(No Model.)

M. E. RADICK.
COVER FOR FRYING PANS, &c.

No. 517,708. Patented Apr. 3, 1894.

WITNESSES:
John A. Rennie
C. Sedgwick

INVENTOR
Mary E. Radick
BY
Munn & Co
ATTORNEYS.

UNITED STATES PATENT OFFICE.

MARY E. RADICK, OF WHITE PLAINS, NEW YORK.

COVER FOR FRYING-PANS, &c.

SPECIFICATION forming part of Letters Patent No. 517,708, dated April 3, 1894.

Application filed January 10, 1894. Serial No. 496,397. (No model.)

*To all whom it may concern:*

Be it known that I, MARY E. RADICK, of White Plains, in the county of Westchester and State of New York, have invented a new and Improved Cover for Frying-Pans and Like Culinary Vessels, of which the following is a full, clear, and exact description.

In the culinary operation of broiling, frying or otherwise cooking with fat in a frying pan or like vessel, or upon a gridiron, when a cover is not employed, grease frequently escapes from the vessel and soils the top of the stove, the floor and the garments of the cook or the persons near by, and when the ordinary cover is used to confine the grease to the pan the contents of said pan are subject to the action of steam arising from the vaporization of the juices of the article being cooked. The confined steam, in many cases, is either detrimental to the article being cooked or retards and injures the cooking. Furthermore, in the act of lifting up the old form of cover from a cooking vessel the water or grease adhering to the inside surface of the cover at once runs downward to the lower edge of the cover, where it collects into the form of an offensive stream or drip, which falls upon the stove or other object toward which the cover is directed.

The object of my invention is to provide a cover adapted for use with various culinary vessels, and so constructed that when it is removed from the vessel all drip from the cover will be prevented.

A further object of my invention is to provide a means whereby any vapor generated in the process of frying may find exit through the cover while the latter is fitted on the vessel.

Another object of my invention, when it is used in the process of broiling, is to provide for a draft of air downward through the cover and through the fire to the chimney, whereby all smoke and odors from the cooking will be carried up chimney and not allowed to escape into the apartment. I also seek to so locate the handle of the cover that said cover may be lifted from the vessel without injury to the hand.

The invention consists in the novel construction and combination of the several parts, as will be hereinafter fully set forth, and pointed out in the claim.

Reference is to be had to the accompanying drawings, forming a part of this specification, in which similar letters of reference indicate corresponding parts in all the figures.

Figure 1:
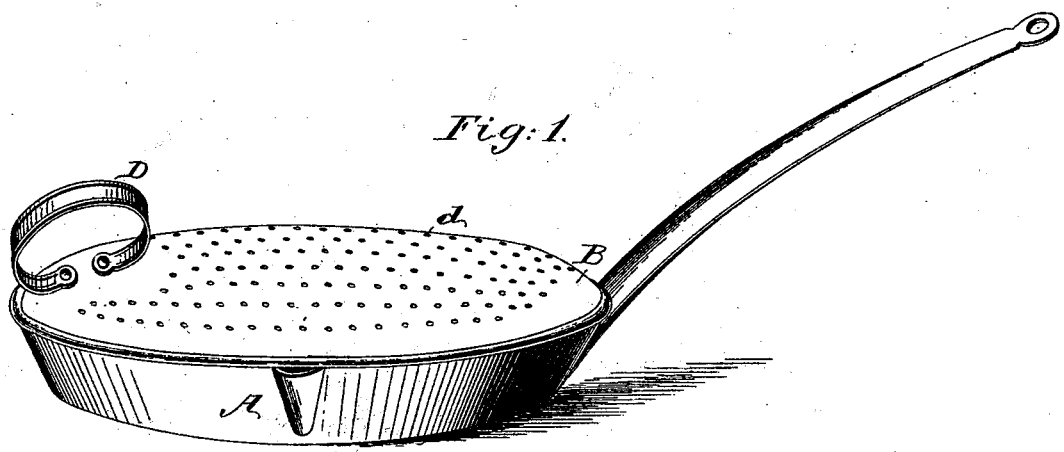
Figure 2:
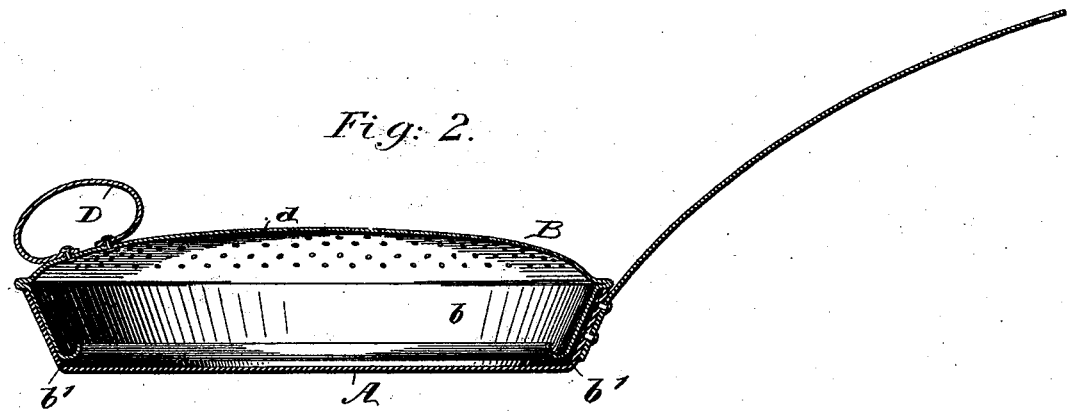
Figure 3:
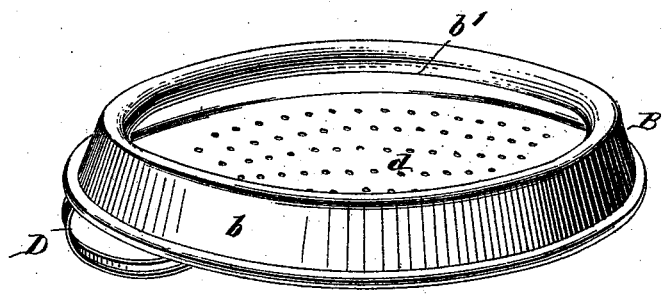

Figure 1 presents a perspective view of a frying pan and the improved cover applied thereto. Fig. 2 is a vertical section taken through the pan and its cover at a point near their centers; and Fig. 3 is a perspective view of the cover in an inverted position.

In the example of the invention shown in the drawings, the vessel A represented is a frying pan of ordinary construction. The cover B is made to fit over the top of the frying pan or vessel, and said cover is provided with the usual pendent flange $b$, which flange is inwardly and upwardly curved at its lower end, forming thereby a continuous gutter or channel $b'$. In forming the gutter or channel the flange is preferably curved in a gradual manner, as illustrated in Fig. 2. Ordinarily the flange $b$ is of such depth that the gutter or channel $b'$ will be located near the bottom of the pan or vessel when the cover is applied thereto.

The gutter or channel $b'$ has two functions; primarily the gutter is adapted to receive and retain whatever—grease or other matter or particles may condense or lodge upon the inner surface of the cover, thus preventing the said condensations from dripping from the cover when the latter is lifted from the pan, or when it is placed upon a convenient support. The secondary function of the gutter or channel is that its convexed under surface forms a firm bearing for the cover when placed upon a support, and the said convexed surface will likewise prevent the cover from marring any surface upon which it may rest, even though that surface be a polished one.

The cover is further provided in its upper surface with a series of apertures $d$, but preferably the apertures are omitted from the surface of the cover to which the handle D is secured, said handle being represented in the drawings as attached to one side of the top portion of the cover.

In the use of the cover for the purpose of frying, the apertures $d$ are adapted to permit the escape of steam from the interior of the pan or vessel when the latter is closed by the cover, thus improving the cooking of the article contained in the vessel, by preventing the access of air while the escape of said steam is permitted. By omitting the apertures from the cover in the space adjacent to the handle D the latter may be grasped and removed when the cover is in position upon the vessel, without danger of the hand being burned or scalded by the escaping steam. The shape of the cover may be varied to correspond to the shape of the vessel upon which it is employed.

A cover of the construction above set forth may be used with good results in the process of broiling with a gridiron. In this case the bottom of the gridiron is exposed to the fire through the usual opening of the stove, and when my improved cover is placed over the gridiron and its contents, there will be a draft of air down through the perforations in the cover into and through the fire to the chimney, and thus all vapors, fumes and odors will be carried up chimney and prevented from escaping into the apartment. At the same time any flying grease, water or condensations that collect upon the inside of the cover will be collected in the gutter thereof and all drip prevented, as before described.

Having thus fully described my invention, I claim as new and desire to secure by Letters Patent—

A cover for frying pans, gridirons and like culinary vessels, provided with a pendent flange which is upwardly and inwardly curved at its lower edge, forming a groove or channel for the reception of matter which may run from the inner face of the cover, substantially as shown and described.

MARY E. RADICK.

Witnesses:
C. SEDGWICK,
F. W. HANAFORD.